United States Patent

[11] 3,581,284

[72] Inventor Ronald B. Selden North Hollywood, Calif.
[21] Appl. No. 734,091
[22] Filed June 3, 1968
[45] Patented May 25, 1971
[73] Assignee T R W Inc. Redondo Beach, Calif.

[54] RANDOMLY ACCESSED NON-INTERFERING INPUT-OUTPUT DATA ACCUMULATOR
5 Claims, 6 Drawing Figs.

[52] U.S. Cl. ........ 340/172.5
[51] Int. Cl. ........ G06c 25/02
[50] Field of Search ........ 340/172.5; 235/92

[56] References Cited

UNITED STATES PATENTS

| | | | |
|---|---|---|---|
| 2,813,676 | 11/1957 | Boyer et al. | 235/92 |
| 2,998,192 | 8/1961 | C. D. Florida | 235/92 |
| 3,145,293 | 8/1964 | M. E. Homan | 235/92 |
| 3,324,456 | 6/1967 | Brown et al. | 340/172.5 |

*Primary Examiner*—Paul J. Henon
*Assistant Examiner*—Mark Edward Nusbaum
*Attorney*—Daniel T. Anderson, Esq.

ABSTRACT: There is disclosed a data accumulator suitable for use in oil field supervisory control systems or, more generally, in various process control or other data processing systems wherein it is desired to accumulate total at the remote location at any time without destroying or interfering with the accumulating total regardless of when the readout command is received. In order to accomplish this, there is provided a shift register adapted to contain the total count data in the form of a binary word having a predetermined number of bits. The shift register is connected in a feedback loop such that its contents may be serially read out and passed through a specialized adding circuit which either transmits the register content in unchanged form or adds one to the total content depending upon whether the adding circuit has been actuated by receipt of an add command from a bistable input buffer means which receives the input unit event counting pulse. The output of the adding circuit is applied as feedback to the input of the shift register in such a fashion that the register content is continuously circulating. The timing parameters of the circuit are chosen so that the total duration of the input unit event count pulse is greater than the total time duration of the complete work content of the shift register. On this basis, the adding circuit logic can be shown to produce a correct and unambiguous result regardless of when the input pulse arrives or when a readout is desired. The online readout is, of course, taken from the adding circuit.

$$
\begin{array}{l}
t_0 = a_n 2^n \cdots + a_2 2^2 + a_1 2^1 + a_0 2^0 \\
\qquad\qquad\qquad\qquad\qquad\qquad + 1 \\
\hline
t+ = a_n 2^n \cdots + a_2 2^2 + a_1 2^1 + (a_0 + 1) 2^0
\end{array}
$$

| a | (a + 1) | Carry |
|---|---|---|
| 0 | 1 | 0 |
| 1 | 0 | 1 |

```
0 0 0 1 0 1 1 0 0
                1
-----------------
0 0 0 1 0 1 1 0 1
                1
-----------------
0 0 0 1 0 1 1 1 0
                1
-----------------
0 0 0 1 0 1 1 1 1
                1
-----------------
0 0 0 1 1 0 0 0 0
```

Ronald B. Selden
*INVENTOR.*

BY
Donald C Kearney
ATTORNEY

Ronald B. Selden
INVENTOR.

BY Donald C. Keaveney
ATTORNEY

Ronald B. Selden
*INVENTOR.*

BY Donald C. Keaveney
ATTORNEY

RANDOMLY ACCESSED NON-INTERFERING INPUT-OUTPUT DATA ACCUMULATOR

BACKGROUND OF THE INVENTION

The term "accumulator" usually refers to a device which stores a number and, upon receipt of another number, adds the two numbers and then stores the sum. Many types of accumulators are known for specialized service in many different types of equipment. Reference is made, for example, to Chapter 4 and in particular to page 98 et seq. of a book by R. K. Richards entitled, "Arithmetic Operations in Digital Computers" published in 1955 by D. Van Nostrand Company, Inc. For components and circuits implementing the operations discussed therein, reference may also be made to another book by the same author and publisher entitled, "Digital Computer Components and Circuits" published in 1957.

Adders generally and accumulators in particular have been of either the parallel operation or serial operation type. In process control apparatus of the type particularly considered herein where the new or input number to be added may be restricted to the case where it is always zero or one, that is, to the case where unit events are counted one at a time and a total accumulated, the accumulators have formerly been of a parallel operation type in order to accommodate a nondestructive readout at any random time even while a new input pulse was being applied. This use of the parallel operation type of accumulator requires, of course, more communication channels and considerably more complex equipment than is necessary if a serially operating accumulator is used. By virtue of appropriate timing parameters and new adder circuitry which utilizes the fact that the number to be added can never exceed one in the intended application, this invention provides circuitry such that the advantages of greater simplicity and lower cost inherent in a serial type of accumulator can be obtained while still retaining the capability of random access noninterfering readout.

SUMMARY OF THE INVENTION

It is an object of the present invention to provide an accumulator from which output may be serially read at any time without interfering with input to the accumulator and without destroying the established count.

It is a further object of the invention to provide such an accumulator particularly suitable for use in process control systems such as oil field supervisory control systems wherein a plurality of slave units each containing one or more accumulators at remote locations may be interconnected through a master unit to process control apparatus.

It is a further object to provide simplified adding circuitry suitable for use in connection with an input buffer and a serial shift register connected in a feedback loop including said adding circuitry to form a recirculating accumulator.

These and other objects and advantages are achieved as noted generally above by connecting a serial shift register in a feedback loop with adding circuitry and providing a buffer input stage from which the add command is applied to the adding circuit only when a unit event counting pulse is applied to the input buffer. The unit input pulse duration is selected to be greater than the word length of the binary word contained in the shift register. From this fact and from the logic of the circuitry, to be described in detail below, it can be demonstrated that the word content of the shift register can be constantly recirculated through the adder from which online output can be constantly or intermittently derived and that the adder will add one to the accumulator content being circulated through it once and only once for each event count pulse applied to the buffer regardless of when that count is applied during the recirculation cycle. This arithmetic operation is performed by logic circuitry to be described in detail below which forms the specialized adder and which implements an algorithm which will be shown to necessarily produce the desired results.

DESCRIPTION OF THE PREFERRED EMBODIMENT

Figures 1A, 1B, 1C, 2:
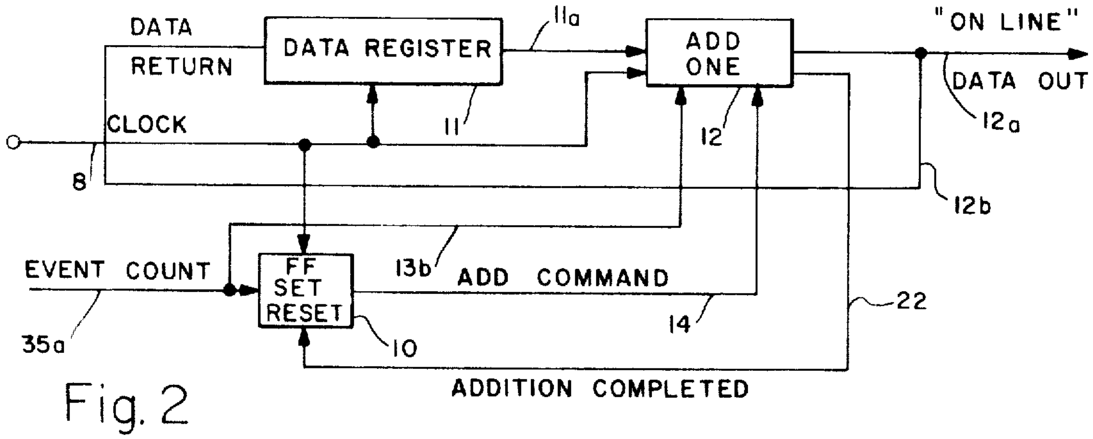
FIG. 1*a* is a symbolic representation of the addition process to be carried out by the accumulator.
FIG. 1*b* is a chart illustrating the various possible binary numerical relationships which can arise in the addition.
FIG. 1*c* is a numerical specific example illustrating the addition of a binary 1 four times in sequence to an exemplary starting number.
FIG. 2 is a block diagram of the accumulator of the present invention.

Turning to the drawings, there is shown in FIG. 1*a* a general representation of a binary number which at time $t_0$ may equal an accumulated count having a value equal to $a_n 2^n \ldots + a_2 2^2 + a_1 2^1 + a_0 2^0$. This number will at time $t_0$ be stored in the data shift register 11 shown in FIG. 2. The content of data register 11 is applied over output line **11*a* to the "add one" circuit 12 the output from which is in turn available for online use to a utilization circuit over line 12*a* and is also fed back over line 12*b* to the input of data register 11. In its quiescent state the add one circuit 12 will simply transmit the contents of data register 11 in unchanged form so that the content is serially read out over line 12*a* and also returned into the register over line 12*b***. The binary word in the data register is of course represented by a series of word character intervals containing voltage pulses or absence of pulses in the usual conventional binary notation.

If an event count pulse input is applied from the process count transducer over line **35*a* to buffer flip-flop 10, the flip-flop 10 applies an add command over line 14 to the add one circuit 12. The adding circuit 12, the data register 11, and the buffer flip-flop 10 are all timed by a common series of clock pulses which are applied to all three of these circuits over clock-pulse line 8 and its indicated branches. If the word content of data register 11 passes through the adding circuit 12 after an add command has been received, the circuitry of block 12 will increase the binary numerical value of the word by one and will then return an addition completed signal pulse over line 22 to reset the flip-flop 10. The word representing the new total count is then similarly available for online utilization on line 12*a* and is recirculated back to input of data register 11 on line 12*b*. The event count pulse input line 35 is connected not only to buffer flip-flop 10 but also by line 35 to another input of the adding circuitry 12 at gate 18 to always indicate to it the presence of an input pulse on line 35 to prevent counting the same input pulse twice, as seen in detail in FIG. 3**.

The type of addition to be performed in the adder circuit 12 may be seen specifically in FIG. 1*a*, 1*b*, and 1*c*. The above-noted general binary number having the value indicated at $t_0$ when increased by a count of one has a value at time $t_+$ which is equal to $a_n 2^n \ldots + a_2 2^2 + a_1 2^1 + (a_0+1) 2^0$ as seen in FIG. 1*a*. In FIG. 1*b* there is shown a chart of the various possible situations which may occur assuming that each addition operation is an addition of one and only one. Of course, if no count pulse is applied during the word's transit through the adder circuit, the trivial case of adding 0 to the existing number produces the same unchanged number at the output. When a unit count is added, however, the results may be either of the two cases indicated in FIG. 1*b*. If $a_0$ is zero at time $t_0$ then $(a_0+1)$ at time $t_+$ will be one with a carry of zero. On the other hand, if $a_0$ is already one at time $t_0$, then at time $t_+$ the binary addition to produce $(a_0+1)$ will result in a zero coefficient with a carry of one.

The specific manner in which this is carried out in a particular case is illustrated in FIG. 1*c* for four successive additions of one in the lowest significant digit to the original binary number 000101100. It will be seen that the first addition of one to the right-hand zero changes it to a 1 and produces no carry in accordance with the table. The second addition of one is now made, however, to a number having a one in its lowest order and this 1 is therefore changed to a zero producing a carry of 1 so that after the second binary addition, the new accumulated total is 000101110. The third addition of 1 changes the lowest order zero digit to a 1 so that the third accumulated total becomes 000101111. The fourth and final addition of 1 changes the last four ones to zero and produces the carry 1 digit in the fifth place or $2^4$ order. Thus, the final total becomes 000110000.

From the fact that we specify that the number to be added is never more than 1, we know that no carry will be produced unless the lowest order digit in the previously accumulated total is itself a 1. If such a carry is produced, it will then be propagated upwardly through the digit orders of the prior total until it is added to a zero which will change the zero to a one but produce no carry as may be seen from the table of FIG. 1*b* or the final addition example in FIG. 1*c*. From these facts we may deduce an algorithm which can be implemented in the adder circuit 12 in a manner considerably simpler than that usually employed to implement adder circuits of general applicability. This algorithm is as follows:

1. Start at the lowest order bit; that is, start at the coefficient of $2^0$, and proceed to successively higher order bits until the first zero coefficient of any order is found.
2. Produce the one's complement of the coefficients of all orders examined in Step 1 including the first zero encountered.
3. Copy exactly the remaining bits after the first zero.

A consideration of FIGS. 1*a*, 1*b*, and 1*c* will make it obvious that implementation of the above algorithm will under all circumstances produce the desired binary addition of one. Thus, in FIG. 1*c* considering the original binary number and applying the algorithm to it, the very first digit is transcribed and an exact copy of the remaining digits is brought down. This produces the first total or second binary number shown. In the next step, one proceeds to the second digit before encountering a zero and therefore the one's complement, 01, of the first two digits, 10, is transcribed and an exact copy of the remaining digits is then made. The third addition is a repetition of the case in the first addition in which the first digit is a zero. In the fourth addition one encounters four ones before the first zero is encountered. Therefore, each of the four ones has its binary complement, zero, transcribed. The binary complement, 1, of the first encountered zero is also transcribed and thereafter an exact copy of the remaining bits is transcribed to produce the correct numerical result.

Figure 3:
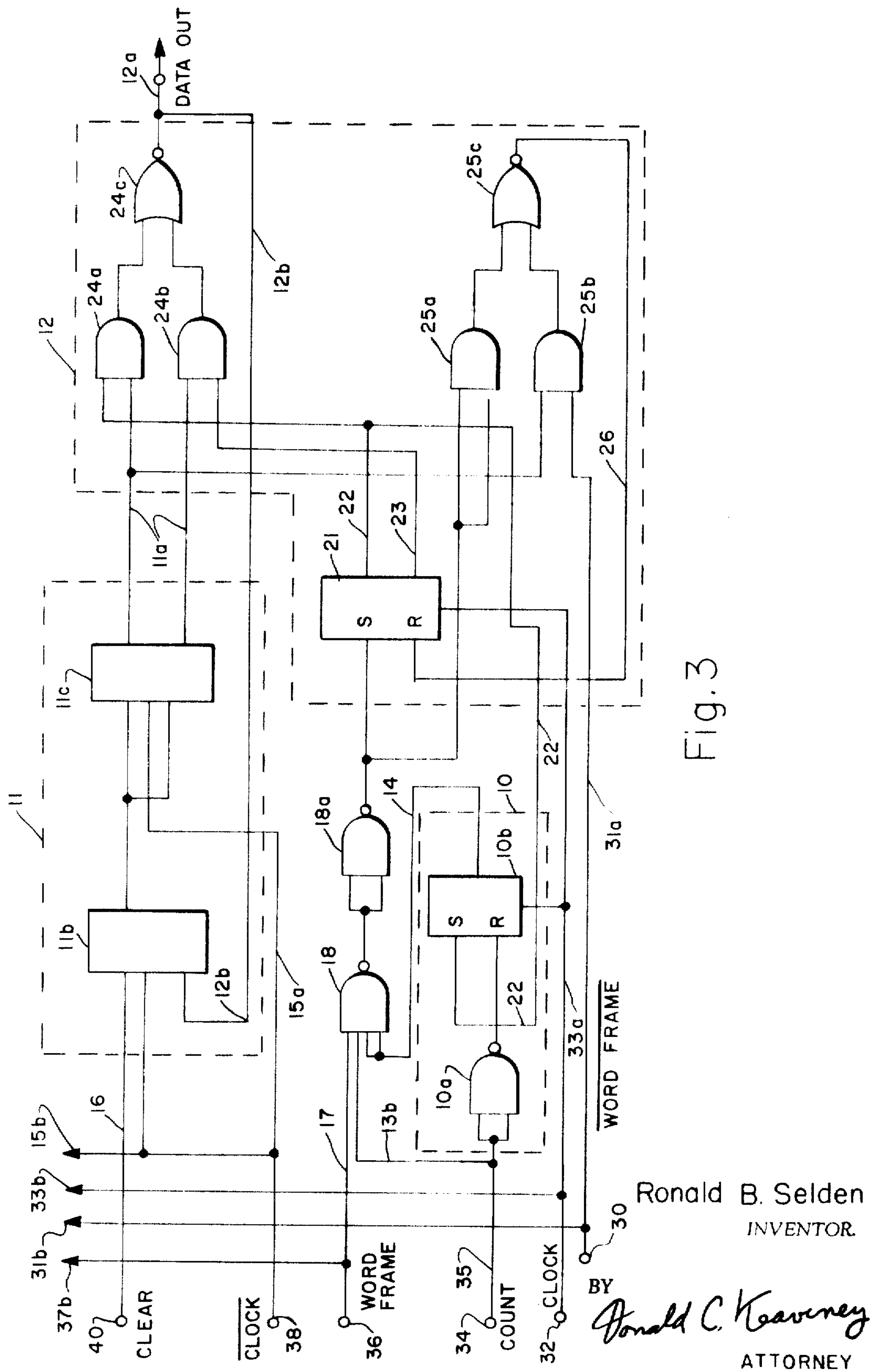
FIG. 3 is a detailed logic diagram of the circuitry of the accumulator illustrated in FIG. 2.

The manner in which the recirculating shift register including adding circuit 12 implements the algorithm will now be discussed in connection with the detail logic diagram shown in FIG. 3 and the waveforms shown in FIG. 4. In FIG. 3 the block diagram elements identified in FIG. 1 are shown in dashed outline form while the circuit logic implementing these functions is shown in solid line form within these dashed blocks. Thus, the data register 11, the "add one" circuit 12, and the input buffer flip-flop 10 are indicated by appropriate corresponding reference characters in FIG. 3. Output from the data register is taken over lines 11*a* to the adding circuit 12 whose output appears on line 12*a* for online use and is fed back over line 12*b* to the input of the shift register 11. Similarly, the addition completed signal line 22 is indicated in FIG. 3 by reference character 22 as is the signal line 13*b* and the add command line 14.

Conventional military standard block symbols have been used in FIG. 3 to indicate logical function circuits such as the input AND circuit 10*a* which feeds the input buffer flip-flop 10*b* in the event count input stage 10 and the logical OR circuit 24*c* which is connected to receive the outputs from AND circuits 24*a* and 24*b* in the adder stage 12. Adder stage 12 also includes AND circuits 25*a* and 25*b* the outputs from which are connected to OR circuit 25*c*. Gates 25*a*, 25*b* and 25*c* serve to detect whether the bit being transmitted through the adder is a one or a zero. Flip-flop 21 is also included in the adder circuit to terminate addition after a zero is recognized. In the shift register 11, there are included two 8-bit shift register stages 11*b* and 11*c* to give a 16-bit word format.

Considering now the various input lines shown in FIG. 3, it will be noted that the clock input which was schematically shown as the single line 8 in FIG. 1, is in fact implemented by a clock signal derived from terminal 32 and applied over line 33*a* to the input stage and to the adder and by the complement of this clock signal which is derived from terminal 38 and applied over line 15*a* to the shift register 11. There is no particular significance to this dual clock signal arrangement in this accumulator stage. It is shown simply because it was in fact available and conveniently used in equipment in which the device was incorporated. The waveforms available on terminals 32 and 38 are indicated in FIGS. 4*a* and 4*b*, respectively. A word frame signal suitable for use in a system employing a 16-bit word is shown in FIG. 4*c* and is available on line 17 from terminal 36. Similarly, the complement of the word frame signal is available from terminal 30 over line 31*a* and is shown in FIG. 4*d*. Clock time $t_0$, as shown in FIG. 4, is defined by the negative going edge of the clock pulse in FIG. 4*a* which is bracketed in time by the first positive state of the word frame waveform shown in FIG. 4*c*. In addition to the connections shown in FIG. 3, the word frame waveform may also be connected to enable an AND gate having the data output on line 12*a* as its input and requiring, if desired, a coincident remotely transmitted readout command as the second enabling signal to transmit the data to a remote reading or master unit.

It will be understood that in actual practice, four or more accumulators of the type shown in FIG. 3 would normally be mounted on a single circuit board. Hence, the clock and word frame lines are shown connected to conductors which may lead to adjacent accumulators for parallel feed operation. Thus, the terminal 30 on which the not word frame signal appears is connected not only to line 31*a* but also to line 31*b* which leads to adjacent stages. Similarly, the word frame signal from terminal 36 is connected not only to line 17 but also to line 37*b* leading to adjacent stages. In the same fashion, the clock signal from 32 is connected both to lines 33*a* and 33*b* whereas the not clock signal or complementary clock signal from terminal 38 is connected not only to line 15*a* but also to line 15*b* leading to adjacent stages. On the other hand, the clear signal which is available from terminal 40 in line 16 to clear the contents of shift register 11 is individually applied for separate control of each accumulator and similarly the unit event counting pulse from the process or event to be monitored or counted is available individually in each stage at terminal 34 which is connected by line 35 to the AND stage 10*a* of the input buffer 10. A unit event input count pulse of the type normally occurring on terminal 34 is shown in FIG. 4*e*. It will, in particular, be noted that the raw input event count pulse must be longer than the word frame pulse and must overlap the beginning and end of the word frame.

To insure that this is the case in practice, the input event count pulse is made equal to twice the time duration of the word frame pulse in this exemplary equipment. Logically, any effective overlap such as ($n$+1 bit times is sufficient.

The add command which is generated on line 14 is shown in FIG. 4*f*. It will be noted that this add command is initiated at the beginning of a word frame as shown in FIG. 4*c* when an event count pulse coexists with the beginning of a word frame. The add command pulse of FIG. 4*f*, however, terminates prior to the end of the word frame even though the event count pulse is greater than the word frame.

The internal add pulse which is generated to carry out the algorithm recited above is shown in FIG. 4*g* and begins one clock pulse after the beginning of the add command pulse of FIG. 4*f*. The duration of the internal add pulse of FIG. 4*g* depends upon the previous content of the shift register 11 but in no event will it exceed the duration of the add command pulse of FIG. 4*f*.

Consider now the operation of the accumulator shown in FIG. 3.

Prior to the occurrence of an event count pulse on terminal 34, the previously accumulated data is contained in shift register 11. Clock pulses of the type shown in FIG. 4*b* are applied to terminal 38 and via line 15*a* to circulate the data in the shift register to the right. The clear line 16 from terminal 40 is normally true (which in this particular system is taken as positive level). The word frame signal of the type shown in FIG. 4*c* which is applied from terminal 36 via line 17 may be in any state. Assume that it is in its low voltage state which implies we are now in the middle of the present cycle. Line 17 then inhibits gate 18. Thus, independently of the state of line 13*b* which carries the raw pulse or event count pulse of the type shown in FIG. 4*e* from terminal 34 and line 35, and independently of line 14 which carries the add command as shown in FIG. 4*f*, the gate 18*a* is false which prevents flip-flop 21 from being set. Because 21 is reset the data in register 11 is circulating through the feedback loop without being changed. Prior to incrementing the contents of register 11, the signal on line 35 from terminal 34 is zero or low. To begin the sequence the signal on line 35 will become true at some time $t_o$. That is, we shall soon add one count. Now, flip-flop 21 will set at $t=t_o$ clock, that is, at the negative edge of a clock pulse during positive input pulse level. At $t_1$, line 22 equals zero and line 23 equals one. Thus, we can insure that data is recirculated by the gate configuration of circuits 24*a*, 24*b* and 24*c*.

At $t_o$ the increment due to the current raw event count pulse begins. Line 22 changes from zero to one and line 23 changes from one to zero. Now, data is complemented by gate 24*c*, having been passed by gate 24*a*. This is the implementation of the algorithm criteria number one. This continues until a zero is sensed by gate 25*b* which is enabled by the complement word frame. When the zero is presented to gate 25*b* input, the output line 26 of gate 25*c* changes from zero to one. This resets flip-flop 21 at the next clock and thus completes a single cycle of adding one to the count previously in register 11 in response to the arrival of an input count pulse.

Figure 4:
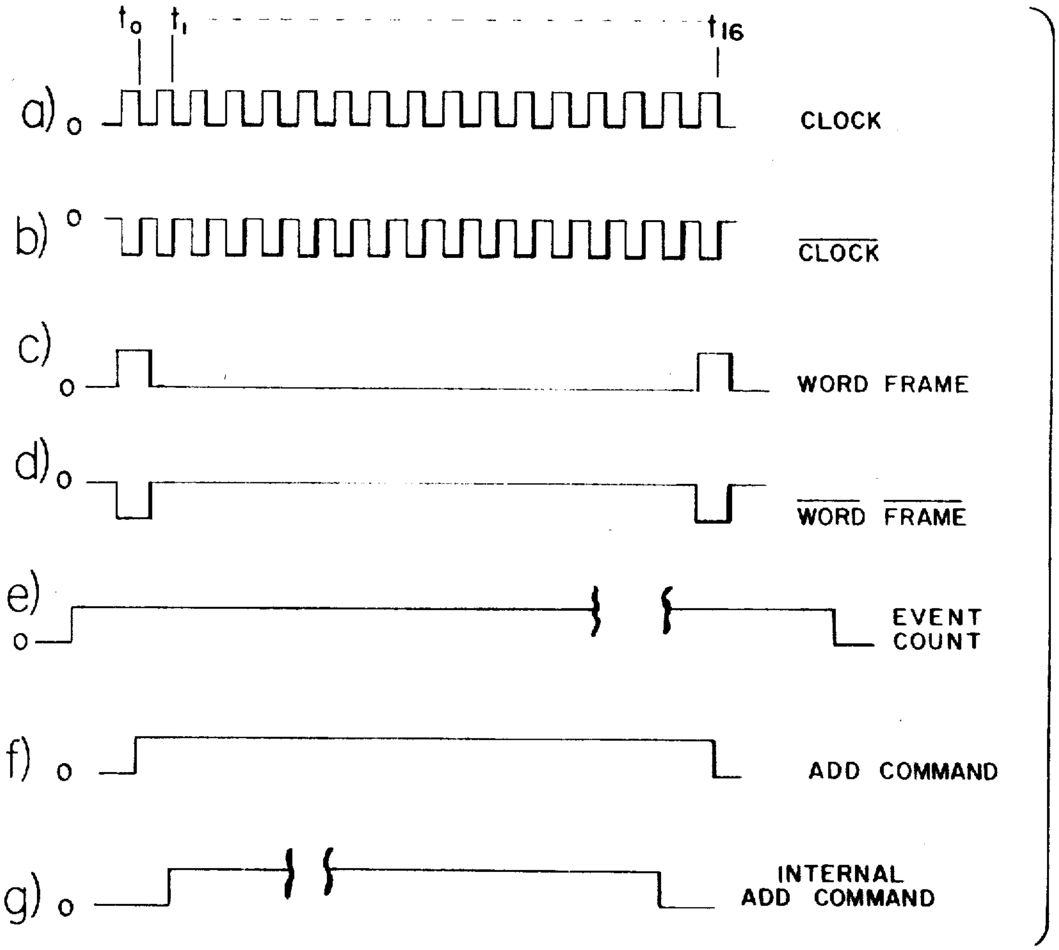
FIG. 4 is a plurality of waveform graphs illustrating time and voltage-pulse relationships in the operation of the circuit.

In order to see that the correct readout will be obtained independently of when the input pulse arrives, notice from the above discussion that the addition starts at $t_o$ bit time zero as indicated in FIG. 4 and finishes some time between $t=1$ and $t=15$ on the clock pulse counting cycle, depending upon the data which previously existed in the register 11.

However, before the addition starts the previous correct count was contained in the shift register 11 and was available on line 12*b* because flip-flop 21 was reset and gate 24*b* and 24*c* passed the data forward. Thus, the data bit at line 12*b* will be acted upon when flip-flop 21 is set. Since the set terminal of flip-flop 21 is controlled through AND gate 18–18*a*, and since the inputs to gate 18 include both the word frame timing pulse formation shown in FIG. 4*C* and the raw data input event count pulse, flip-flop 21 will in fact be turned to the set condition only when the word frame pulse occurs while an event pulse is also being applied. Thus, the word frame count in effect serves as a clock or sampling pulse which determines when the event count pulse (which is greater than the duration of the word frame) will become effective to set flip-flop 21. At this point, when flip-flop 21 is set, the data on line 12*b* is the previous data in the register plus one since the data has circulated through the activated adding circuit 12.

While a specific preferred embodiment of the invention has been described by way of illustration only, it will be understood that the invention is capable of many other specific embodiments and modifications and is defined solely by the following claims.

I claim:

1. Data processing circuitry for adding one to a digitally encoded binary number comprising:

circuitry having a given word capacity;

a. input means to present to said circuitry a binary coded number having a plurality of orders of significance each having a coefficient which is either zero or one, said coefficient being presented sequentially in ascending order of significance;

said binary coded number having a duration greater than the total duration of said word content of said circuitry;

b. circuit means to sequentially produce the one's complement of said coefficient as they are presented, means responsive to the first zero coefficient of any order of said number for controlling said circuit means; and, c. circuit means responsive to the occurrence of said first zero coefficient to thereafter reproduce without change the remaining coefficients of said higher orders of said binary number whereby said complete binary number is increased by one.

2. A randomly accessed noninterfering input-output data accumulator comprising:

a. a data shift register having an input and an output for handling a digitally encoded word;

b. a feedback loop comprising an adding circuit and connected to serially read the content of said data shift register from its output through the adding circuit and back to the input of said register;

c. bistable means responsive to receipt of a unit event count pulse input, said bistable means being connected to actuate said adding circuit upon receipt of said pulse to add one to the word content of said register as said word passes through said adding circuit, said unit event count pulse having a duration greater than the total duration of said word content of said register; and d. means to serially apply the output of said adding circuit to a utilization circuit.

3. Apparatus as in claim 2 and further including means connected to change the state of said bistable means responsive to completion of said addition by said adding circuit.

4. Data processing circuitry comprising:

a. a shift register having an input and an output for handling a binary number;

b. a feedback loop comprising an adding circuit connected to serially read the content of said shift register from its output through the adding circuit and back to the input of said shift register, said serial readout starting with the lowest order of said binary number and continuing sequentially to progressively higher orders;

c. said adding circuit comprising command responsive means responsive to a unit event count pulse having a duration greater than the total duration of said word content of said register to produce the one's complement of the coefficient of each order of said binary number, the first zero coefficient of any order of said number being transmitted through said adding circuit, and means responsive to transmission of said first zero coefficient to transmit the remaining coefficients of higher orders of said binary number through said adding circuit and said feedback loop without change whereby a complete circulation of the entire number in said shift register through said adding circuit increases the numerical magnitude of the binary number in said shift register by one when said command responsive means has been actuated.

5. A randomly accessed noninterfering input-output data accumulator comprising:

a. adding circuit means to add one to a digitally encoded plural bit binary number transmitted through said adding circuit;

b. a shift register containing a representation of a digitally encoded binary number;

c. means connecting the output of said shift register to the input of said adding circuit and further means connecting the output of said adding circuit to the input of said shift register to form a closed feedback loop;

d. means to supply a clock signal to said shift register to continuously serially move the content of said shift register through said adding circuit and back into said shift register;

e. buffer circuit input means for receiving a unit event count pulse;

f. an AND gate circuit connected to receive a signal output from said buffer circuit at one of its inputs and to receive a word frame pulse input signal at another of its inputs;

g. said word frame pulse signal having a period equal to the sum of the total periods of the clock pulses in the total representation of all of the bits in said binary number in said shift register and said unit event input pulse having a period of duration greater than the period of said word frame pulse;

h. means connecting the output of said AND gate circuit to enable said adding circuit to commence addition upon the coincident occurrence of a unit event count pulse and said word frame pulse;

i. means to apply a signal from said adding circuit to said input buffer circuit indicating completion of said addition process; and, j. means to derive an online output reading from the output of said adding circuit.